(12) United States Patent
Kappelman et al.

(10) Patent No.: US 11,991,957 B2
(45) Date of Patent: May 28, 2024

(54) BALE WRAPPING SYSTEM WITH PROPORTIONAL CYCLE ACCELERATION

(71) Applicant: DEERE & COMPANY, Moline, IL (US)

(72) Inventors: Jacob D. Kappelman, Bloomfield, IA (US); Jeremy M. Erdmann, Floris, IA (US); Jonathan D. Vasquez, Tempe, AZ (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/447,741

(22) Filed: Sep. 15, 2021

(65) Prior Publication Data
US 2023/0081287 A1  Mar. 16, 2023

(51) Int. Cl.
*A01F 15/07* (2006.01)
*A01F 15/08* (2006.01)

(52) U.S. Cl.
CPC ........ *A01F 15/071* (2013.01); *A01F 15/0883* (2013.01); *A01F 2015/076* (2013.01); *A01F 2015/0891* (2013.01)

(58) Field of Classification Search
CPC ........ A01F 2015/076; A01F 2015/0891; A01F 15/071; A01F 15/0883
USPC .......................................................... 53/203
See application file for complete search history.

(56) References Cited

U.S. PATENT DOCUMENTS

| | | | |
|---|---|---|---|
| 4,610,123 A | 9/1986 | Krone et al. | |
| 5,301,493 A | 4/1994 | Chen | |
| 5,433,059 A | 7/1995 | Kluver et al. | |
| 6,651,408 B1 | 11/2003 | McClure | |
| 8,601,770 B2 | 12/2013 | Paillet et al. | |
| 10,440,895 B2 | 10/2019 | Eubanks et al. | |
| 10,517,221 B2 | 12/2019 | Thoreson et al. | |
| 2004/0016204 A1 | 1/2004 | Chow et al. | |
| 2010/0236427 A1* | 9/2010 | Derscheid | A01F 15/0715 53/118 |
| 2016/0183474 A1* | 6/2016 | Thoreson | B65B 57/04 53/399 |
| 2018/0310482 A1* | 11/2018 | Reijersen Van Buuren | A01F 15/0715 |
| 2021/0022295 A1* | 1/2021 | Simmons | A01F 15/071 |

OTHER PUBLICATIONS

Extended European Search Report and Written Opinion issued in European Patent Application No. 22194017.4, dated Jan. 25, 2023, in 07 pages.

* cited by examiner

*Primary Examiner* — Anna K Kinsaul
*Assistant Examiner* — Luis G Del Valle

(57) ABSTRACT

A method of controlling a wrap system of a round baler includes determining a current characteristic of a supply roll of wrap material related to a current weight of the supply roll, and controlling rotation of a pair of spool rollers based on the current characteristic of the supply roll. As the current characteristic indicates a decrease in weight, the rotation of the pair of spool rollers is controlled to achieve a desired acceleration rate of the spool rollers, such that a leading edge of the wrap material is ejected from a nip formed between the pair of spool rollers at an ejection trajectory that is within an allowable angular range relative to a tangent of the nip, so that the leading edge of the wrap material passes through an access and into a baling chamber of the round baler.

9 Claims, 5 Drawing Sheets

BALE WRAPPING SYSTEM WITH PROPORTIONAL CYCLE ACCELERATION

TECHNICAL FIELD

The disclosure generally relates to a round baler and a method of controlling a wrap system of the round baler.

BACKGROUND

Round balers are typically equipped with a wrap system for wrapping a bale with a wrap material secure the bale in a cylindrical shape for storage and transport. The wrap material may include, but is not limited to, a net material or a solid sheet material. Some wrap systems are configured with a pair of spool rollers that are positioned to form a nip therebetween, and which inject the wrap material through an access and into a baling chamber. The wrap material is a very flexible material and can be difficult to control, especially when starting the wrapping cycle in which a leading edge of the wrap material must be inserted through the access and into the baling chamber.

One challenge with these types of systems is the lack of control of the mesh trajectory as the wrap material is ejected from the nip between the pair of spool rollers. There are many variables that can cause undesirable trajectories on the wrap material and result in the wrap material not aligning with the access and being blocked from the entering the baling chamber.

SUMMARY

A method of controlling a wrap system of a round baler is provided. The wrap system includes a supply roll of a wrap material and a pair of spool rollers forming a nip therebetween. The pair of spool rollers receive the wrap material from the supply roll through the nip. The method includes determining a current characteristic of the supply roll related to a current weight of the supply roll of the wrap material, and controlling rotation of the pair of spool rollers based on the current characteristic of the supply roll related to the current weight of the supply roll of the wrap material.

In one aspect of the disclosure, the rotation of the pair of spool rollers is controlled to achieve a desired acceleration rate of the spool rollers, such that a leading edge of the wrap material is ejected from the nip at an ejection trajectory that is within an allowable angular range relative to a tangent of the nip so that the leading edge of the wrap material passes through an access of a baling chamber of the round baler.

In one aspect of the disclosure, the wrap system includes a driver that is controllable to supply torque to the pair of spool rollers. The method includes selectively controlling the driver to vary the torque supplied to the pair of spool rollers based on the current characteristic of the supply roll related to the current weight of the supply roll of the wrap material. In one aspect of the disclosure, the driver may include a belt that is coupled to one of the pair of spool rollers and a tensioner operable to tension the belt. Selectively controlling the drive to vary the torque supplied to the pair of spool rollers based on the current characteristic of the supply roll related to the current weight of the supply roll of the wrap material may include selectively controlling the tensioner to adjust the tension of the belt based on the current characteristic of the supply roll indicates an increase in the current weight of the supply roll of the wrap material. It should be appreciated that adjusting the tension of the belt adjusts the amount of torque that the belt may transmit. As such, adjusting the tension of the belt may be used to control torque transfer to the pair of spool rollers.

In one aspect of the disclosure, selectively controlling the driver to vary the torque supplied to the pair of spool rollers based on the current characteristic of the supply roll related to the current weight of the supply roll of the wrap material may include decreasing the torque supplied to the pair of spool rollers as the current characteristic of the supply roll indicates a decrease in the current weight of the supply roll to maintain the desired acceleration rate of the pair of spool rollers. As such, the torque applied to the pair of spool rollers is proportional to the weight of the supply roll of the wrap material. Additionally, the rate at which the torque is applied to the pair of spool rollers may be varied based on the current characteristic of the supply roll related to the current weight of the supply roll of the wrap material. Particularly, the rate at which the torque is applied to the pair of spool rollers may be decreased as the weight of the supply roll of the wrap material decreases to maintain the desired acceleration rate of the pair of spool rollers.

In one aspect of the disclosure, the current characteristic of the supply roll related to the current weight of the supply roll of the wrap material may be determined by sensing data related to, but is not limited to, a mass of the supply roll of the wrap material, a radial size of the supply roll of the wrap material, a diametric size of the supply roll of the wrap material, a rotational inertia of the supply roll, or a volume of the supply roll of the wrap material. The data may be obtained by a sensor. The sensor may include, but is not limited to, and electronic sensor such as but not limited to, a weight sensor, a distance sensor, an optical sensor, a potentiometer, etc. In other implementations, the sensor may include mechanical sensors, such as springs, levels, cam and followers, etc.

In one aspect of the disclosure, the pair of spool rollers includes a first roller and a second roller. The first roller includes an elastomer defining a cylindrical outer elastomer surface of the first roller. The second droller may include an elastomer defining a cylindrical outer elastomer surface of the second roller. The supply roll of the wrap material may rest against the cylindrical outer elastomer surface of the first roller along a contact region. The supply roll is continuously pressed against the cylindrical outer elastomer surface of the first roller as a diametric size of the supply roll of the wrap material decreases. The wrap material partially encircles the first roller between the contact region and the nip about an axis of rotation of the first roller. The wrap material passes through the nip. During initiation or the beginning of a wrap cycle, a leading edge of the wrap material is ejected from the nip at the ejection trajectory.

The cylindrical outer elastomer surface of at least the first roller generates a friction or static force with the wrap material, thereby coupling the wrap material to the cylindrical outer elastomer surface of the first roller. This coupling causes the ejection trajectory of the leading edge of the wrap material to change as the acceleration of the pair of spool rollers changes. The process described herein controls the acceleration of the pair of spool rollers to achieve a desired acceleration rate. When operated at the desired acceleration rate, the ejection trajectory of the wrap material is within the allowable angular range relative to the tangent of the nip. The allowable angular range aligns with the access into the baling chamber. As long as the leading edge of the wrap material is within the allowable angular range, the leading edge should pass through the access and into the baling chamber.

The elastomer of the first roller exhibits a static and/or frictional force against the wrap material. When new, the static and/or frictional force is considerably higher than after a period of use. In other words, the static and/or frictional force exhibited by the elastomer of the first roller decreases from an initial value to a substantially constant value over a period of initial use. The static and/or frictional force exhibited by the elastomer may affect the ejection trajectory of the wrap material. In one aspect of the disclosure, the desired acceleration rate of the pair of spool rollers may be defined based on a usage of the pair of spool rollers. For example, the desired acceleration rate of the pair of spool rollers may be defined to include a first value for an initial usage period and a second value for a subsequent usage period. The initial usage period may be defined as a number of bales wrapped, a number of hours of operation, etc. The subsequent usage period may be defined as the remainder of the useful life of the pair of spool rollers.

In one aspect of the disclosure, the usage of the baler may be monitored, and the desired acceleration rate may be automatically re-defined from the first value to the second value after the initial usage period. In so doing, the ejection trajectory may be maintained within the allowable angular range during both the initial usage period and the subsequent usage period.

During the operational life of the round baler, the pair of spool rollers may require replacement. In one aspect of the disclosure, in response to replacing the pair of spool rollers with an un-used pair of spool rollers after the subsequent usage period, the desired acceleration rate of the pair of spool rollers may be re-established at the first value for the initial usage period.

A round baler is also provided. The round baler includes a baling system defining a baling chamber. The baling chamber includes an inlet providing entrance into the baling chamber. The baling system is operable to receive crop material into the baling chamber through the inlet and form the crop material into a bale within the baling chamber. The round baler further includes a wrap system. The wrap system is operable to insert a wrap material through an access and into the baling chamber to wrap the bale. The access may include the inlet through which the crop material is moved through and into the baling chamber, or may include a separate opening into the baling chamber. The wrap system includes a pair of spool rollers forming a nip therebetween. The pair of spool rollers are configured to rotate about respective axes of rotation in opposite rotational directions relative to each other and receive a wrap material from a supply roll through the nip. A driver is coupled to the pair of spool rollers and operable to transmit torque to the pair of spool rollers to rotate the pair of spool rollers about their respective axes of rotation. A torque controller is coupled to the driver. The torque controller is configured to control torque transmitted to the pair of spool rollers based on a current characteristic of the supply roll related to a current weight of the supply roll of the wrap material. The torque transmitted to the pair of spool rollers is controlled to achieve a desired acceleration rate of the spool rollers, such that a leading edge of the wrap material is ejected from the nip at an ejection trajectory that is within an allowable angular range relative to a tangent of the nip. When the ejection trajectory is within the allowable angular range, the leading edge of the wrap material is aligned with and may pass through the access and into the baling chamber.

In one aspect of the disclosure, the pair of spool rollers includes a first roller and a second roller. The first roller includes an elastomer defining a cylindrical outer elastomer surface of the first roller. The second roller may also include an elastomer defining a cylindrical outer elastomer surface of the second roller.

In one aspect of the disclosure, a support structure is configured to support the supply roll of the wrap material relative to the pair of spool rollers. The support structure supports the supply roll of the wrap material such that the supply roll of the wrap material rests against the cylindrical outer elastomer surface of the first roller along a contact region.

In one aspect of the disclosure, the round baler may include a sensor operable to sense data related to a weight of the supply roll of the wrap material. In one implementation, the sensor may include an electronic sensor such as but not limited to a potentiometer, an optical sensor, etc. In other implementations, the sensor may be configured as a mechanical sensor that is sensitive to and/or reacts to a physical property and/or movement of the supply roll of the wrap material, in which case the sensor may include a spring, a lever, cam and follower structure, combinations thereof, etc. The sensor may be configured to sense a characteristic of the supply roll of the wrap material that is related to a weight of the supply roll of the wrap material. For example, the sensor may be configured to sense data related to a force, a radial size, a diametric size, a volume, etc.

In one aspect of the disclosure, the driver may include a belt coupled to one or both of the pair of spool rollers. A tensioner is coupled to the blet and is operable to tension the belt. The torque controller is configured to selectively control the tensioner to adjust the tension of the belt to vary the torque supplied to the pair of spool rollers based on the current weight of the supply roll of the wrap material.

In one implementation of the round baler, the torque controller may include a computing device having a processor and a memory having a wrap feed control algorithm stored thereon. The processor is operable to execute the wrap feed control algorithm to receive data related to a weight of the supply roll of the wrap material from the sensor, and control the driver to adjust torque transmitted to the pair of rollers. The torque is controlled to achieve the desired acceleration rate of the pair of rollers. The torque from the driver may be decreased as the weight of the supply roll of the wrap material decreases. The computing device of the torque controller may be coupled to and in communication with the tensioner, and operable to communicate a control signal to the tensioner. For example, the computing device may communicate a signal to the tensioner, causing one an actuator of the tensioner to move, thereby adjusting the tension of the belt.

In other implementations, the torque controller may include mechanical linkages, connections, pivots, levers, cams, followers, etc., that are coupled to the supply roll of the wrap material. The mechanic linkages may be configured to transmit forces and/or movements of the supply roll to the tensioner, whereby the tensioner is response to the movements in order to adjust tension in the belt.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
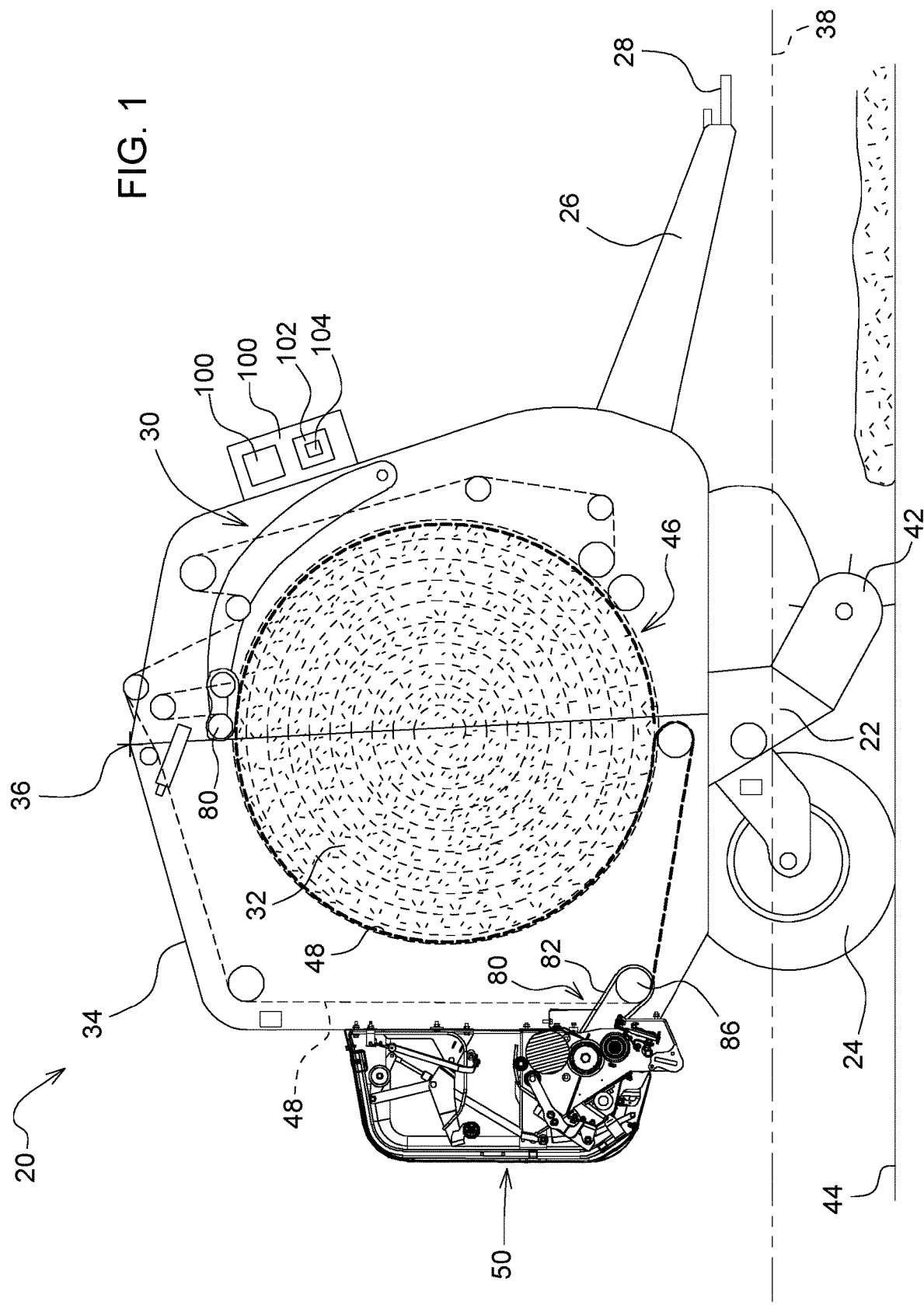
FIG. 1 is a schematic side view of a round baler.

Referring to FIG. 1, a round baler is generally shown at 20. The round baler 20 includes a frame 22. One or more ground engaging elements 24, such as but not limited to one or more wheels and/or tracks, are attached to and rotatably supported by the frame 22. A tongue 26 may be coupled to the frame 22 at a forward end of the frame 22. A hitch arrangement 28 may be included with the tongue 26. The hitch arrangement 28 may be used to attach the round baler 20 to a traction unit, such as but not limited to an agricultural tractor. In other embodiments, the round baler 20 may be self-propelled, in which case the traction unit and the round baler 20 are configured as a single, self-propelled vehicle.

The round baler 20 includes a baling system 30. The baling system 30 forms a baling chamber 32. The baling system 30 is attached to and supported by the frame 22. The baling system 30 may include one or more walls or panels that at least partially enclose and/or define the baling chamber 32. In the example implementation shown in the Figures and described herein, the round baler 20 further includes a gate 34. The gate 34 is attached to and rotatably supported by the frame 22. The gate 34 is positioned adjacent a rearward end of the frame 22 and is pivotably moveable about a gate axis 36. The gate axis 36 is generally horizontal and perpendicular to a central longitudinal axis 38 of the frame 22. The gate 34 is moveable between a closed position for forming a bale within the baling chamber 32, and an open position for discharging the bale from the baling chamber 32.

The round baler 20 includes a pick-up 42 disposed proximate the forward end of the frame 22. The pickup gathers crop material from a ground surface 44 and directs the gathered crop material toward and into an inlet 46 of the baling chamber 32. The pickup may include, but is not limited to tines, forks, augers, conveyors, baffles, etc., for gathering and moving the crop material. The round baler 20 may be equipped with a pre-cutter, disposed between the pickup and the inlet 46. As such, the pre-cutter is disposed downstream of the pickup and upstream of the inlet 46 relative to a direction of travel of the crop material. The pre-cutter cuts or chops the crop material into smaller pieces.

The round baler 20 may be configured as a variable chamber baler, or as a fixed chamber baler. The round baler 20 shown in the Figures and described herein is depicted and described as a variable chamber baler. As is understood by those skilled in the art, the variable chamber baler includes a plurality of longitudinally extending side-by-side forming belts 48 that are supported by a plurality of rollers. The bale is formed by the forming belts 48 and one or more side walls of the housing.

The crop material is directed through the inlet 46 and into the baling chamber 32, whereby the forming belts 48 roll the crop material in a spiral fashion into the bale having a cylindrical shape. The forming belts 48 apply a constant pressure to the crop material as the crop material is formed into the bale. A forming belt tensioner continuously moves the forming belts 48 radially outward relative to a center of the cylindrical bale as the diameter of the bale increases. The forming belt tensioner maintains the appropriate tension in the forming belts 48 to obtain the desired density of the crop material.

Figure 2:
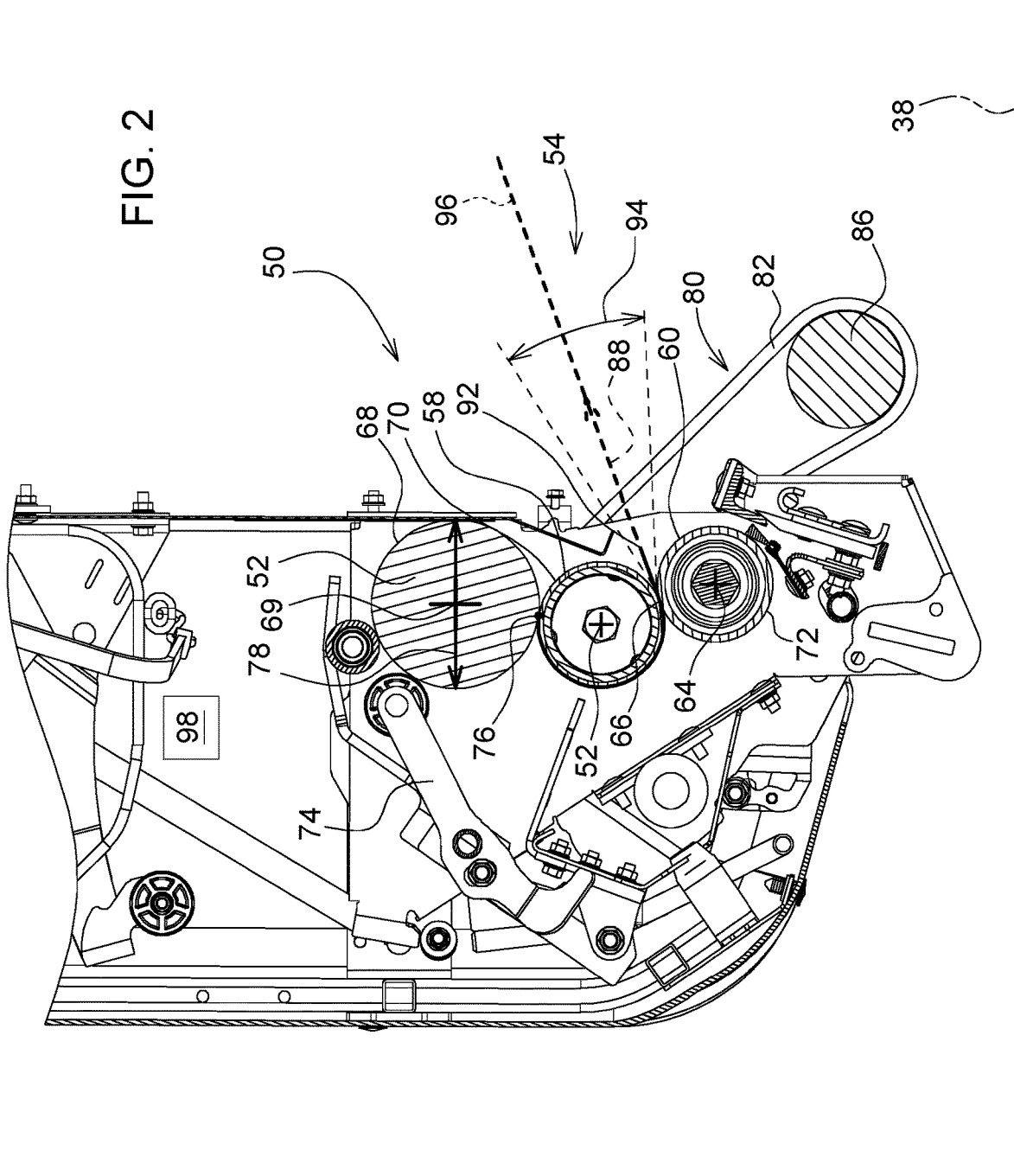
FIG. 2 is a schematic cross sectional partial side view of a wrap system viewed from a first side of the round baler showing a supply roll of a wrap material having a reduced diameter.
Figure 3:
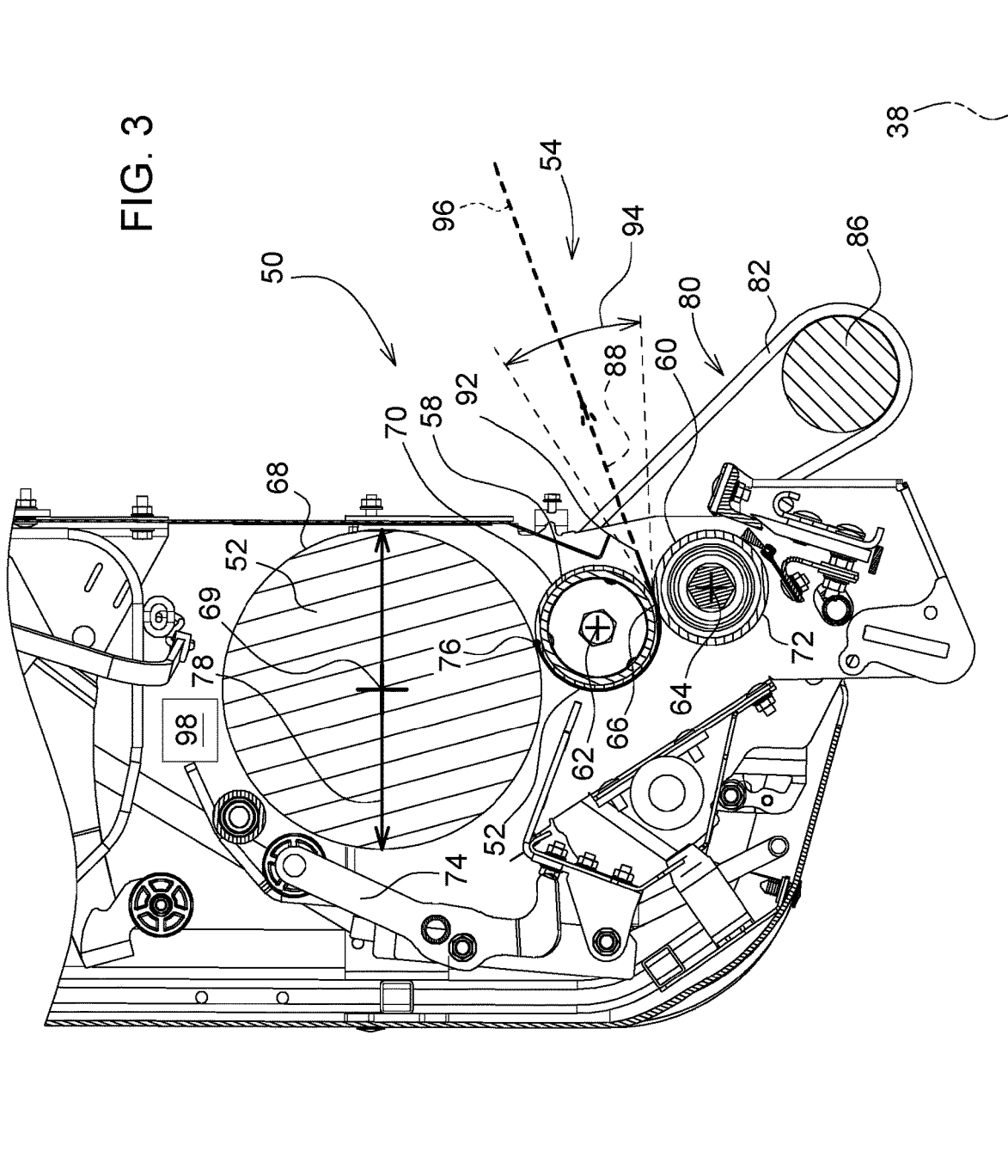
FIG. 3 is a schematic cross sectional partial side view of the wrap system viewed from the first side of the round baler showing the supply roll of the wrap material having a full size diameter.
Figure 4:
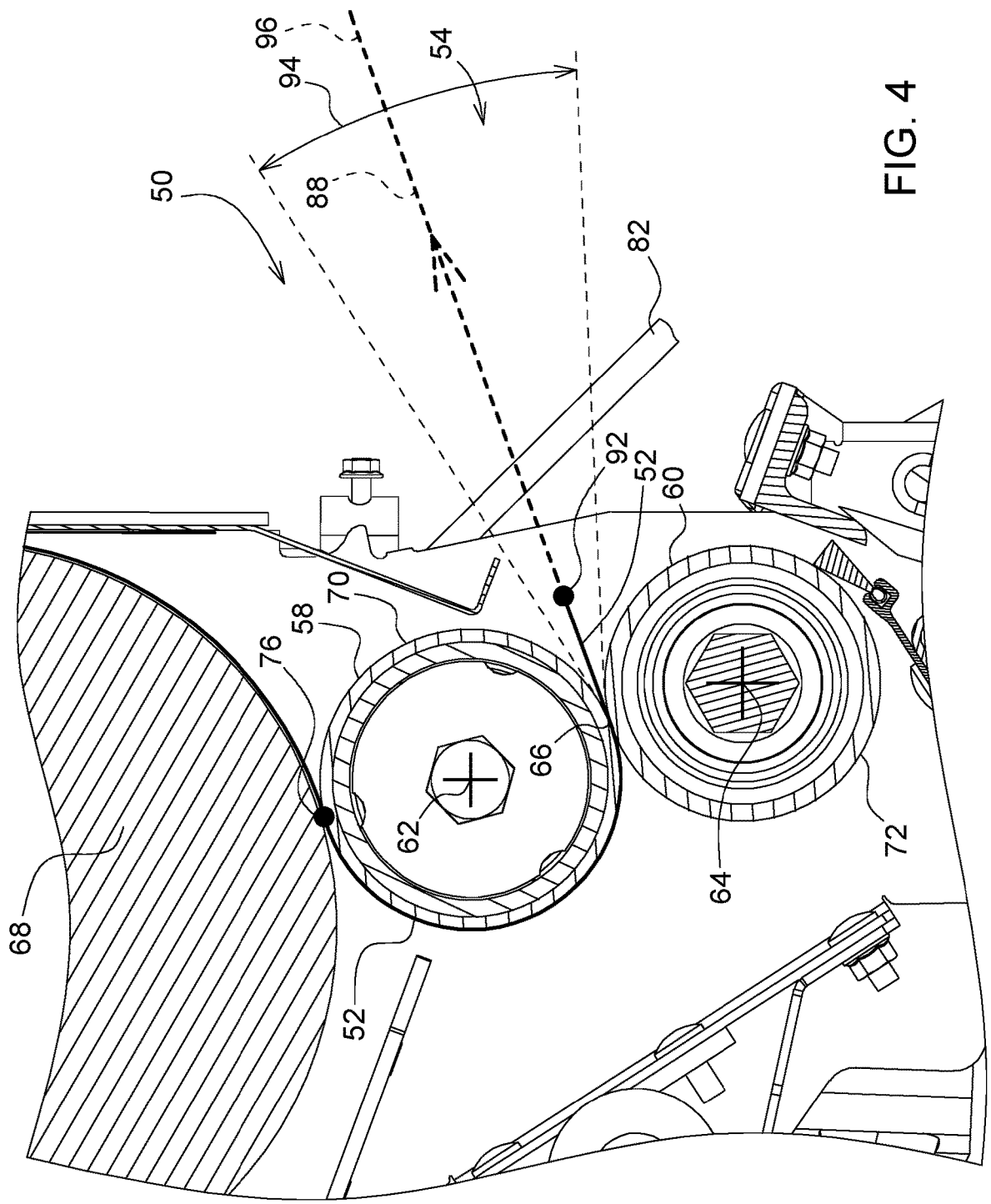
FIG. 4 is a schematic an enlarged cross sectional partial side view of the wrap system viewed from the first side of the round baler showing an ejection trajectory of the wrap material.

The round baler 20 includes a wrap system 50. The wrap system 50 is operable to wrap the bale with a wrap material 52 inside the baling chamber 32. Once the bale is formed to a desired size, the wrap system 50 is initiated to begin a wrap cycle. Referring to FIGS. 2-4, when a wrap cycle is initiated the wrap system 50 feeds or inserts the wrap material 52 through an access 54 and into the baling chamber 32 to wrap the bale and thereby secure the crop material in a tight package and maintain the desired shape of the bale. In one implementation, the access 54 may include the inlet 46, through which the crop material moves into the baling chamber 32. In another implementation, the access 54 may include an opening into the baling chamber 32 that is separate from the inlet 46. The wrap material 52 may include, but is not limited to, a net mesh or a solid plastic wrap. Movement of the gate 34 into the open position simultaneously moves the forming belts 48 clear of the formed bale, and allows the formed and wrapped bale to be discharged through the rear of the baling chamber 32.

Referring to FIGS. 2-4, the wrap system 50 includes a pair of spool rollers 58, 60. The pair of spool rollers 58, 60 includes a first roller 58 and a second roller 60. The first roller 58 and the second roller 60 are arranged in a parallel relationship, and extend transversely across a width of the frame 22 in a horizontal orientation, generally perpendicular to the central longitudinal axis 38 of the frame 22. The first roller 58 includes a cylindrical shape having a respective centerline 62, about which the first roller 58 rotates. As such, the respective centerline 62 of the first roller 58 is an axis of rotation of the first roller 58. The second roller 60 includes a cylindrical shape having a respective centerline 64, about which the second roller 60 rotates. As such, the respective centerline 64 of the second roller 60 is an axis of rotation of the second roller 60. The first roller 58 and the second roller 60 are arranged such that a circumferential surface of the first roller 58 and a circumferential surface of the second roller 60 are disposed in contacting or abutting engagement, and form a nip 66 therebetween where their respective circumferential surfaces come together and meet. As used herein, the term "nip" may be defined as, but is not limited to, the region where the first roller 58 and the second roller 60 come together and contact each other.

As described above, the pair of spool rollers 58, 60 are configured to rotate about their respective axes of rotation 62, 64. The first roller 58 and the second roller 60 rotate in opposite rotational directions relative to each other and receive the wrap material 52 from a supply roll 68 through the nip 66. As shown in the example implementation of the Figures, the first roller 58 is rotatable about its' respective axis of rotation 62 in a counter-clockwise direction as viewed on the page of the drawing, and the second roller 60 is rotatable about its' respective axis of rotation 64 in a clockwise direction as viewed on the page of the drawing. As such, the first roller 58 and the second roller 60 cooperate to feed the wrap material 52 through the nip 66, from left to right as viewed on the page of the drawing.

The first roller 58 includes an elastomer defining a cylindrical outer elastomer surface 70 of the first roller 58. The elastomer exhibits static adhesion or "sticky" properties which limits movement of the wrap material 52 relative to the cylindrical outer elastomer surface 70 of the first roller 58. The elastomer may include for example, but is not limited to, a natural or synthetic rubber material, or some other material having similar static adhesion properties.

The second roller 60 may also include an elastomer defining a cylindrical outer elastomer surface 72 of the second roller 60. The elastomer exhibits static adhesion or "sticky" properties which limits movement of the wrap material 52 relative to the cylindrical outer elastomer surface 72 of the second roller 60. The elastomer may include for example, but is not limited to, a natural or synthetic rubber material, or some other material having similar static adhesion properties.

The round baler 20 further includes a support structure 74. The support structure 74 is configured to support the supply roll 68 of the wrap material 52 relative to the pair of spool rollers 58, 60. The support structure 74 supports the supply roll 68 such that the supply roll 68 of the wrap material 52 rests against the cylindrical outer elastomer surface 70 of the first roller 58 along a contact region 76. Because the supply roll 68 of the wrap material 52 rests against the cylindrical outer elastomer surface 70 of the first roller 58, it should be appreciated that the support structure 74 must allow the supply roll 68 of the wrap material 52 to move relative to the frame 22 of the round baler 20 as the wrap material 52 is dispensed to maintain contact between the wrap material 52 on the supply roll 68 and the cylindrical outer elastomer surface 70 of the first roller 58. The support structure 74 may include, but is not limited to, wall portions of a housing of the round baler 20, various guides, pins, grooves, etc. The specific construction of the support structure 74 in which the supply roll 68 of the wrap material 52 is supported understood by those skilled in the art, is not pertinent to the teachings of this disclosure, and is therefore not described in greater detail herein.

As described above, the supply roll 68 of the wrap material 52 rests against the cylindrical outer elastomer surface 70 of the first roller 58 along the contact region 76 and is continuously pressed against the cylindrical outer elastomer surface 70 of the first roller 58 as a radial or diametric size 78 of the supply roll 68 of the wrap material 52 decreases. The contact region 76 is the common contact surface area between the supply roll 68 of the wrap material 52 and the first roller. It should be appreciated that the contact region 76 extends generally parallel with a centerline 69 of the supply roll 68 and the centerline 62 of the first roller 58, across a width of the supply roll 68 of the wrap material 52.

The wrap material 52 follows a routing path that partially encircles the first roller 58, between the contact region 76 and the nip 66 and about the axis of rotation 62 of the first roller 58. The routing path follows a counter-clockwise path around the cylindrical outer elastomer surface 70 of the first roller 58 as viewed on the page of the drawing. The wrap material 52 enters the nip 66 moving from left to right as viewed on the page of the drawing, whereby the wrap material 52 is grasped between the first roller 58 and the second roller 60 at the nip 66. During a wrap cycle, the first roller 58 and the second roller 60 are counter rotated bout their respective axes of rotation 62, 64 to eject the wrap material 52 from the nip 66 toward and through the access 54 and into the baling chamber 32.

Figure 5:
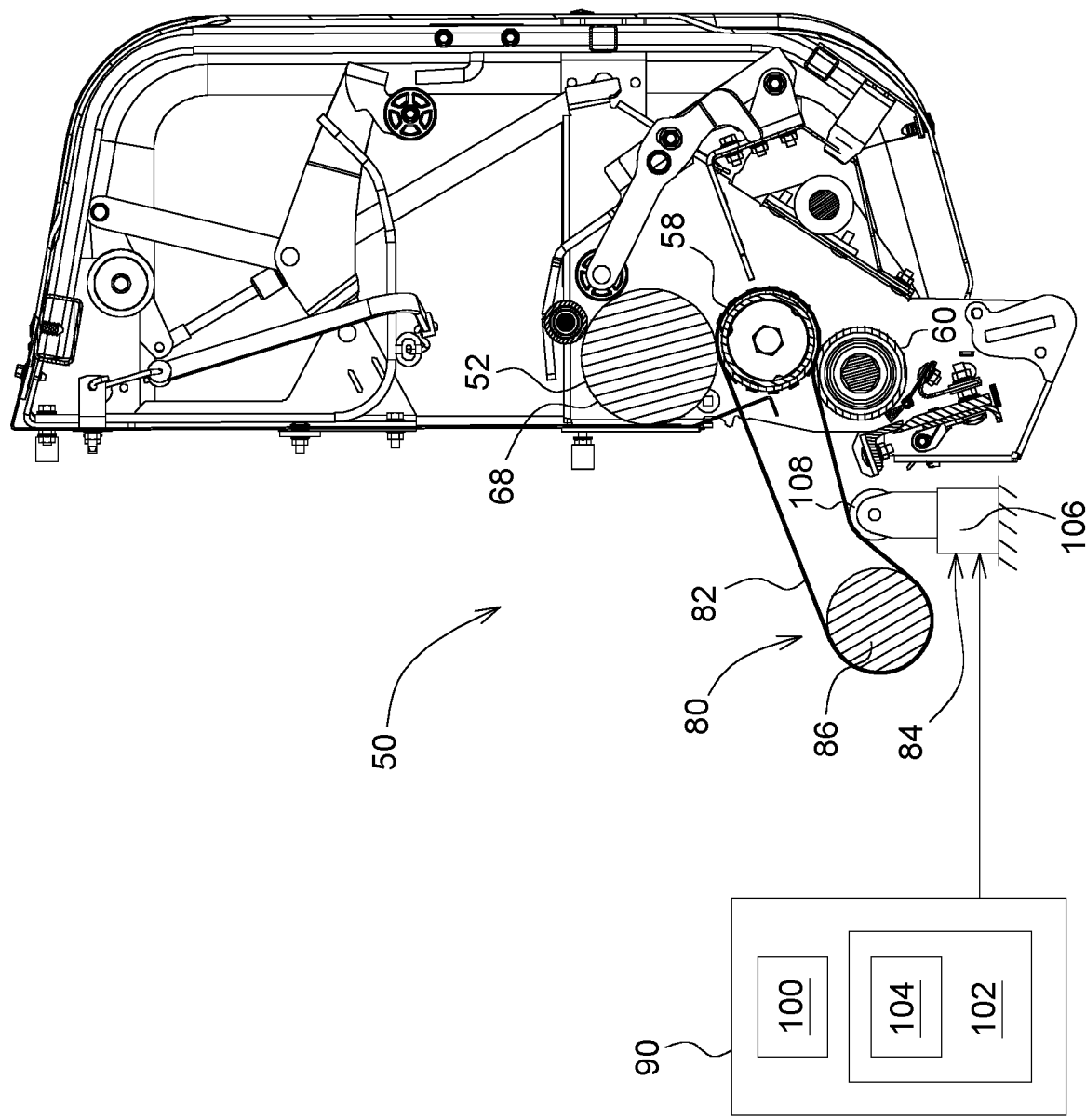
FIG. 5 is a schematic cross sectional partial side view of the wrap system viewed from a second side of the round baler and showing a driver of the wrap system.

Referring to FIG. 5, the wrap system 50 includes a driver 80 that is coupled to the pair of spool rollers 58, 60. The driver 80 is operable to transmit torque to the pair of spool rollers 58, 60 to rotate the pair of spool rollers 58, 60 about their respective axes of rotation 62, 64. The driver 80 may be configured in any suitable manner, and include a device, system, or mechanism capable rotating the pair of spool rollers 58, 60 about their respective axes of rotation 62, 64. In one implementation, the driver 80 includes a belt 82 coupled to at least one of the pair of spool rollers 58, 60 and a tensioner 84 operable to tension the belt 82. The belt 82 may be coupled to a rotating element 86, such as but not limited to a driven roller of the baling system 30, to receive torque therefrom. When the belt 82 is sufficiently tensioned by the tensioner 84, the belt 82 transmits torque from the rotating element 86 to the pair of spool rollers 58, 60, thereby rotating the pair of spool rollers 58, 60 about their respective axes of rotation 62, 64. When tension in the belt 82 is reduced by the tensioner 84, the belt 82 slips relative to the rotating element 86 and/or at least one of the pair of spool rollers 58, 60, such that the pair of spool rollers 58, 60 do not rotate. Accordingly, it should be appreciated that the amount of torque applied to the pair of spool rollers 58, 60 is proportional to and/or controlled by the tension in the belt 82. It should be appreciated the torque transfer to the pair of spool rollers 58, 60 may be controlled via other systems and/or components of the round baler 20, other than the example implementation described herein, such as but not limited to, an adjustable flywheel, braking system, electrically actuated components, hydraulically actuated components, etc.

Observations demonstrate that as the supply roll 68 of the wrap material 52 decreases in weight, such as may occur with a smaller diameter 78 of the supply roll 68 shown in FIG. 2 the angular acceleration rate of the pair of spool rollers 58, 60 from rest when beginning the wrap cycle increases. The higher acceleration rate of the pair of spool rollers 58, 60 that occurs when the weight of the supply roll 68 of the wrap material 52 decreases may result in a less desirable e.g., higher, ejection trajectory 88 toward the access 54 in the baling chamber 32. This is believed to occur because the supply roll 68 of the wrap material 52 is "coupled" to the first roller 58 via the static adhesion of the elastomer forming the outer surface of the first roller 58, thereby causing a "flywheel effect" in which the higher acceleration rate causes the centrifugal forces acting on the wrap material 52 to eject the wrap material 52 at a higher ejection trajectory 88 than occurs with a heavier supply roll 68 of the wrap material 52. If the ejection trajectory 88 of the wrap material 52 from the nip 66 is not aligned with the access 54 into the baling chamber 32, the wrap material 52 may contact other elements and fail to pass through the access 54.

The wrap system 50 includes a torque controller 90. The torque controller 90 is coupled to the driver 80, and is configured to selectively control the driver 80, e.g., the tensioner 84, to adjust torque transfer through the driver 80, e.g., the tension of the belt 82, at the start or initiation of a wrap cycle. The tension in the belt 82 is controlled during initiation of the wrap cycle to vary the torque supplied to the pair of spool rollers 58, 60 based on a current characteristic of the supply roll related to the current weight of the supply roll 68 of the wrap material 52 to achieve a desired acceleration rate of the spool rollers 58, 60. When the acceleration rate of the pair of spool rollers 58, 60 is controlled to the desired acceleration rate during initiation of a wrap cycle, a leading edge 92 of the wrap material 52 is ejected from the nip 66 at the ejection trajectory 88 that is within an allowable angular range 94 relative to a tangent 96 of the nip 66, such that the leading edge 92 of the wrap material 52 passes through the access 54 and into the baling chamber 32.

The ejection trajectory 88 is the trajectory or path that the leading edge 92 of the wrap material 52 follows when ejected from the nip 66 and prior to entering or passing through the access 54 into the baling chamber 32. The ejection trajectory 88 may be described relative to the tangent 96 of the nip 66. As described above, the nip 66 is the contact location where the circular, circumferential exterior surface of the first roller 58 contacts the circular, circumferential exterior surface of the second roller 60. The tangent 96 of the nip 66 is therefore the tangent 96 of the circumferential exterior surface of the first roller 58 and the second roller 60 at the nip 66, and generally extends along the central longitudinal axis 38 of the frame 22.

The allowable angular range 94 is an angle measured relative to the tangent 96 of the nip 66. The allowable angular range 94 may include an angular range above and/or below the tangent 96 of the nip 66, and corresponds with alignment with the access 54 into the baling chamber 32. The allowable angular range 94 may be defined to include all angles relative to the tangent 96 of the nip 66 in which the leading edge 92 of the wrap material 52 will pass through the access 54 and enter the baling chamber 32. It should be appreciated that the allowable angular range 94 may vary with the specific size, shape, orientation, and positioning of the components of the round baler 20, and may vary with different implementations and/or configurations of the round baler 20.

The wrap system 50 may further include a sensor 98 that is operable to sense data related to the characteristic of the supply roll related to the weight of the supply roll 68 of the wrap material 52. It should be appreciated that the weight of the supply roll 68 of the wrap material 52 decreases as the wrap material 52 is dispensed from the supply roll 68. The sensor 98 may include, but is not limited to, an electronic sensor the generates and communicates an electronic signal to the torque controller 90, or a mechanical sensor that generates and communicates movement and/or force to the torque controller 90. The sensor 98 may be configured to sense a mass, a force or a weight of the supply roll 68, a radial or diametric size 78 of the supply roll 68, a volume of the supply roll 68, a rotational inertia of the supply roll, or some other type of data related to the weight of the supply roll 68. If the sensor 98 is implemented as an electronic sensor, the sensor 98 may include, but is not limited to, an optical sensor, a potentiometer, a resistance sensor, or some other implementation that is capable of generating an electronic signal representing and/or associated with the data related to the weight of the supply roll 68. If the sensor 98 is implemented as a mechanical sensor, the sensor 98 may include levers, springs, cam and follower assemblies, linkages, etc., necessary to sense and communicate mechanical forces and/or mechanical movement associated with the weight of the supply roll 68 to the torque controller 90.

As described above, the torque controller 90 is coupled to the driver 80, and is configured to selectively control the tensioner 84 to adjust the tension of the belt 82 at the start or initiation of a wrap cycle. The torque controller 90 may be implemented as a mechanical device responsive to force or movement communicated from the sensor 98. As such, in one implementation, the mechanical based sensor 98 may detect a force or movement, which is communicated to the mechanical based torque controller 90, which in turn controls the tensioner 84.

In other implementations, the torque controller 90 may include an electronic torque controller 90. The torque controller 90 may be disposed in communication with the sensor 98, and the tensioner 84. The torque controller 90 is operable to receive data from the sensor 98 related to the weight of the supply roll 68 of the wrap material 52, and comminate a control signal to the tensioner 84. While the torque controller 90 is generally described herein as a singular device, it should be appreciated that the torque controller 90 may include multiple devices linked together to share and/or communicate information therebetween. Furthermore, it should be appreciated that the torque controller 90 may be located on the round baler 20 or located remotely from the round baler 20.

The torque controller 90 may alternatively be referred to as a computing device, a computer, a controller, a control unit, a control module, a module, etc. The torque controller 90 includes a processor 100, a memory 102, and all software, hardware, algorithms, connections, sensors, etc., necessary to manage and control the operation of the driver 80 and/or tensioner 84. As such, a method may be embodied as a program or algorithm operable on the torque controller 90. It should be appreciated that the torque controller 90 may include any device capable of analyzing data from various sensors, comparing data, making decisions, and executing the required tasks.

As used herein, "torque controller 90" is intended to be used consistent with how the term is used by a person of skill in the art, and refers to a computing component with processing, memory, and communication capabilities, which is utilized to execute instructions (i.e., stored on the memory 102 or received via the communication capabilities) to control or communicate with one or more other components. In certain embodiments, the torque controller 90 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The torque controller 90 may be in communication with other components on the round baler 20, such as hydraulic components, electrical components, and operator inputs within an operator station of an associated work vehicle. The torque controller 90 may be electrically connected to these other components by a wiring harness such that messages, commands, and electrical power may be transmitted between the torque controller 90 and the other components. Although the torque controller 90 is referenced in the singular, in alternative embodiments the configuration and functionality described herein can be split across multiple devices using techniques known to a person of ordinary skill in the art.

The torque controller 90 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 102 may include any non-transitory/tangible medium which participates in providing data or computer-readable instructions. The memory 102 may be non-volatile or volatile. Non-volatile media may include, for example, optical or magnetic disks and other persistent memory. Example volatile media may include dynamic random access memory (DRAM), which may constitute a main memory. Other examples of embodiments for memory 102 include a floppy, flexible disk, or hard disk, magnetic tape or other magnetic medium, a CD-ROM, DVD, and/or any other optical medium, as well as other possible memory devices such as flash memory.

The torque controller 90 includes the tangible, non-transitory memory 102 on which are recorded computer-executable instructions, including a wrap feed control algorithm 104. The processor 100 of the torque controller 90 is configured for executing the wrap feed control algorithm 104. The wrap feed control algorithm 104 implements a method of controlling the wrap system 50, described in detail below.

As described above, the first roller 58 and the second roller 60 may include an elastomer defining the cylindrical outer elastomer surface 70 of the first roller 58 and the second roller 60 respectively. It has been observed that when the elastomer of the first roller 58 and the second roller 60 are new, the static adhesion characteristics of the elastomer tend to be higher, and may increase the ejection trajectory 88 relative to used elastomer, in which the static adhesion decreases. In other words, when the first roll and the second roll are new, the elastomer has a higher degree or amount of static adhesion, and the amount of static adhesion decreases with usage and stabilizes at a lower, more consistent level. The higher static adhesion that occurs when the first roller 58 and the second roller 60 are new may affect the ejection trajectory 88.

In order to address the change in the static adhesion of the first roller 58 and the second roller 60 that occurs with usage, A desired acceleration rate of the pair of spool rollers 58, 60 may be defined based on a usage of the pair of spool rollers 58, 60. For example, the desired acceleration rate of the pair of spool rollers 58, 60 may be defined to include a first value for an initial usage period and a second value for a subsequent usage period. The initial usage period may be defined as a number of bales wrapped, a number of hours of operation, an estimated percent of life cycle, etc. The subsequent usage period may be defined as the remainder of the useful life of the pair of spool rollers 58, 60.

The usage of the round baler 20 may be monitored, for example, by the torque controller 90. If the usage of the round baler 20 is within the initial usage period, then the torque controller 90 may define the desired acceleration rate to equal to the value. If the usage of the round baler 20 is not within the initial usage period, i.e., if the usage of the round baler 20 is within the subsequent usage period, then the torque controller 90 may define the desired acceleration rate to equal the second value. The torque controller 90 may be configured to automatically re-define the desired acceleration rate from the first value to the second value after the initial usage period ends.

A current characteristic of the supply roll 68 of the wrap material 52 related to a current weight of the supply roll 68 of the wrap material 52 is sensed or detected with the sensor 98. The data related to the current weight of the supply roll 68 is then communicated to the torque controller 90, which receives data related to the current weight of the supply roll 68 of the wrap material 52 from the sensor 98. As described above, the sensor 98 may include an electronic sensor that communicates an electronic signal to the torque controller 90, or may include a mechanical sensor that communicates a force or movement to the torque controller 90, or may include a combination of both a mechanic signal and an electronic signal.

The torque controller 90 may then use the data related to the current characteristic related to the current weight of the supply roll 68 to calculate or otherwise determine the current weight of the supply roll 68 of the wrap material 52. The manner in which the toque controller determines the current weight of the supply roll 68 is dependent upon the type of data sensed or detected by the sensor 98. For example, if the sensor 98 detects a radial or diametric size 78, then the torque controller 90 may correlate the radial or diametric size 78 to a weight based on look-up table or other similar process. If the sensor 98 detects a mass force, then the torque controller 90 may convert the mass force signal to the current weight. It should be appreciated that the torque controller 90 may determine the current weight of the supply roll 68 using many different processes, which are understood by those skilled in the art.

Upon initiation of a new wrap cycle to wrap a completed bale with the wrap material 52, the torque controller 90 controls rotation of the pair of spool rollers 58, 60 based on the current weight of the supply roll 68 of the wrap material 52. The rotation of the pair of spool rollers 58, 60 is controlled to achieve the desired acceleration rate of the spool rollers 58, 60. The desired acceleration rate of the spool rollers 58, 60 ejects the leading edge 92 of the wrap material 52 from the nip 66 at an ejection trajectory 88 that is within the allowable angular range 94 relative to the tangent 96 of the nip 66. By ejecting the wrap material 52 with the leading edge 92 thereof at the ejection trajectory 88 within the allowable angular range 94, the leading edge 92 of the wrap material 52 may pass through the access 54 and into the baling chamber 32.

In order to control the rotation of the pair of spool rollers 58, 60, the torque controller 90 selectively controls the driver 80 to vary the torque supplied to the pair of spool rollers 58, 60. Accordingly, the torque supplied to the pair of spool rollers 58, 60 with the supply roll 68 having a smaller diameter 78 and therefore a lesser weight, such as shown in FIG. 2, will be less than the torque supplied to the pair of spool rollers 58, 60 with the supply roll 68 having a larger diameter 78 and therefore a greater weight, such as shown in FIG. 3. The driver 80 is controlled based on the current weight of the supply roll 68 of the wrap material 52. It should be appreciated that for a given current weight of the supply roll 68, a higher applied torque will result in a faster or higher acceleration rate, whereas a lower applied torque will result in a slower or lesser accretion rate. In order to achieve the desired acceleration rate as the weight of the supply roll 68 decreases, the amount of torque transmitted from the driver 80 to the pair of spool rollers 58, 60 may be decreased so that the consistent desired acceleration rate is achieved. As such, the torque from the driver 80 is decreased as the weight of the supply roll 68 of the wrap material 52 decreases.

As described above, in the example implementation shown in the Figures and described herein, the driver 80 includes the belt 82 coupled to one or both of the pair of spool rollers 58, 60, and the tensioner 84 operable to tension the belt 82. Selectively controlling the drive to vary the torque supplied to the pair of spool rollers 58, 60 based on the current weight of the supply roll 68 of the wrap material 52 may include selectively controlling the tensioner 84 to adjust the tension of the belt 82 based on the current weight of the supply roll 68 of the wrap material 52. The tensioner 84 may be controlled via a signal from the torque controller 90. For example, the tensioner 84 may include an actuator 106 coupled to a pulley 108 that is engaged with the belt 82. The position of the pully relative to the belt 82 may affect the tension in the belt 82. As such, engaging or moving the actuator 106 re-positions the pulley 108 and adjusts the tension in the belt 82. The actuator 106 may include, but is not limited to, a hydraulic cylinder, an electric linear actuator, an electric rotary actuator, or some other similar device. The actuator 106 may be controlled via the signal from the torque controller 90.

The pair of spool rollers 58, 60 may be replaced at some point during the normal life cycle of the round baler 20. As described above, the elastomer of the pair of spool rollers 58, 60 exhibits a higher level of static adhesion when new. As such, in response to replacing the pair of spool rollers 58, 60 with an un-used pair of spool rollers 58, 60 after the subsequent usage period, the torque controller 90 may re-establish or re-define the desired acceleration rate of the pair of spool rollers 58, 60 at the first value for the initial usage period.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A round baler comprising:
a baling system defining a baling chamber having an access into the baling chamber, wherein the baling system is operable to receive crop material into the baling chamber through the access and form the crop material into a bale within the baling chamber;
a wrap system operable to insert a wrap material through the access and into the baling chamber to wrap the bale, the wrap system including:
a pair of spool rollers forming a nip therebetween, wherein the pair of spool rollers are configured to rotate about respective axes of rotation in opposite rotational directions relative to each other and receive the wrap material from a supply roll through the nip;
a driver coupled to the pair of spool rollers and operable to transmit torque to the pair of spool rollers to rotate the pair of spool rollers about their respective axes of rotation;
a torque controller including a processor and a memory having a wrap feed control algorithm stored thereon, wherein the processor is operable to execute the wrap feed control algorithm to:
receive data related to a current characteristic of the supply roll related to a current weight of the supply roll of the wrap material from a sensor;
define a desired acceleration rate of the pair of spool rollers such that a leading edge of the wrap material is ejected from the nip at an ejection trajectory that is within an allowable angular range relative to a tangent of the nip, whereby the leading edge of the wrap material passes through the access and into the baling chamber:
control the driver to adjust torque transmitted to the pair of rollers to achieve the desired acceleration rate of the pair of rollers, wherein the torque from the driver is decreased as the characteristic of the supply roller related to the current weight of the supply roll of the wrap material indicates a decrease in the current weight of the supply roll.

2. The round baler set forth in claim 1, wherein the pair of spool rollers includes a first roller and a second roller, with the first roller having an elastomer defining a cylindrical outer elastomer surface of the first roller.

3. The round baler set forth in claim 2, further comprising a support structure configured to support the supply roll of the wrap material, such that the supply roll of the wrap material rests against the cylindrical outer elastomer surface of the first roller along a contact region.

4. The round baler set forth in claim 1, further comprising a sensor operable to sense data related to the characteristic of the supply roll related to the current weight of the supply roll of the wrap material.

5. The round baler set forth in claim 4, wherein the sensor includes one of a force sensor, a radial size sensor, a diametric size sensor, or a volume sensor.

6. The round baler set forth in claim 1, wherein the driver includes a belt coupled to one of the pair of spool rollers and a tensioner operable to tension the belt, wherein the torque controller is configured to selectively control the tensioner to adjust the tension of the belt to vary the torque supplied to the pair of spool rollers based on the current weight of the supply roll of the wrap material.

7. The round baler set forth in claim 1, wherein the processor is operable to execute the wrap feed control algorithm to define the desired acceleration rate of the pair of spool rollers based on a usage of the pair of spool rollers.

8. The round baler set forth in claim 7, wherein the processor is operable to execute the wrap feed control algorithm to define the desired acceleration rate of the pair of spool rollers based on the usage of the pair of spool rollers to include a first value for an initial usage period and a second value for a subsequent usage period.

9. The round baler set forth in claim 8, wherein the processor is operable to execute the wrap feed control algorithm to automatically re-define the desired acceleration rate from the first value to the second value after an initial usage period.

\* \* \* \* \*